May 28, 1935.  J. MELLING  2,002,785
CLUTCH OR BRAKE, OR LIKE MECHANISM
Filed Sept. 2, 1931
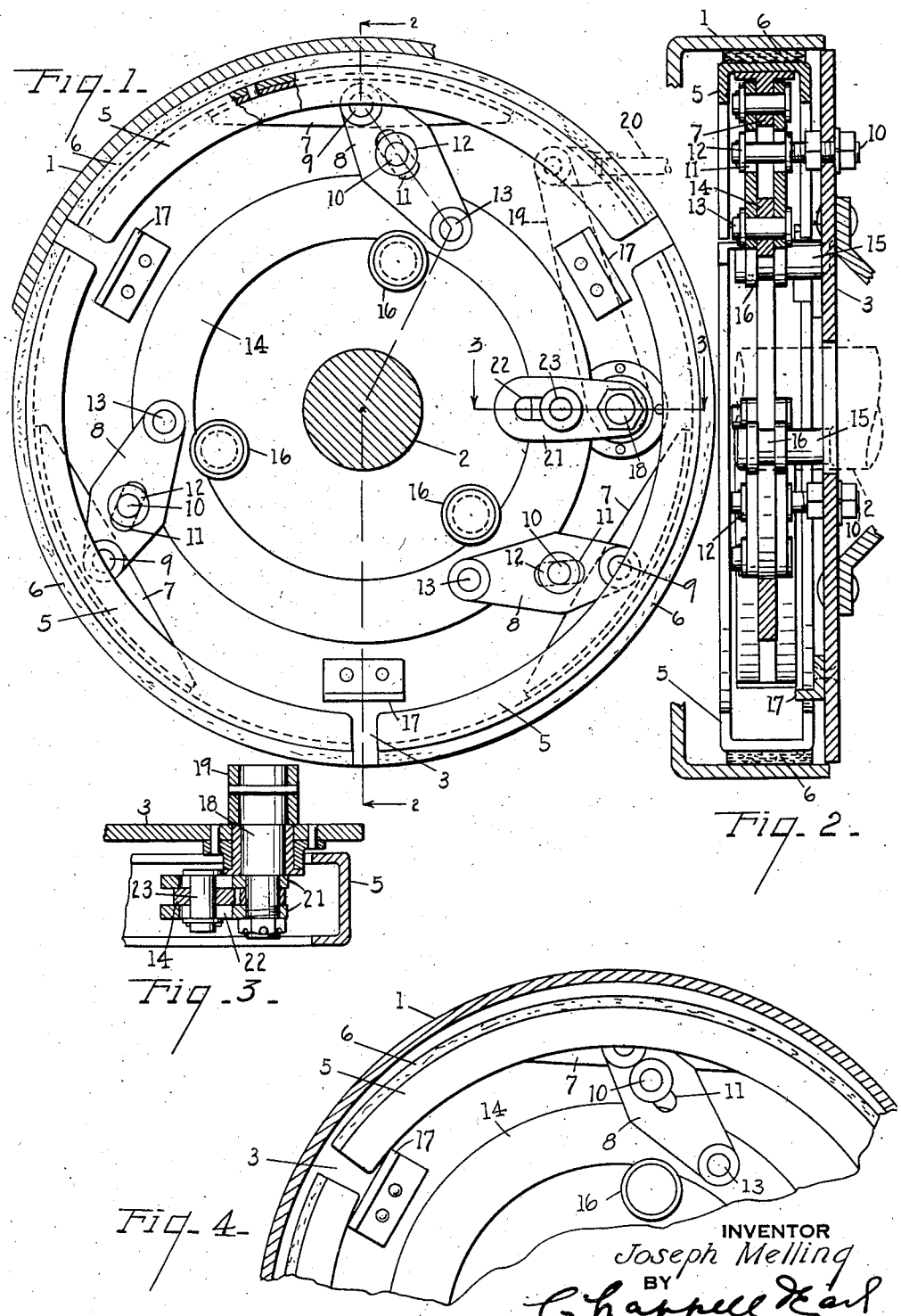
INVENTOR
Joseph Melling
BY
Chappell Earl
ATTORNEYS Patented May 28, 1935

2,002,785

UNITED STATES PATENT OFFICE 2,002,785

CLUTCH OR BRAKE, OR LIKE MECHANISM

Joseph Melling, Jackson, Mich.

Application September 2, 1931, Serial No. 560,730

8 Claims. (Cl. 188—78)

The main object of this invention is to provide a clutch or brake, or like mechanism, which is very powerful and at the same time easy to operate.

A further object is to provide a mechanism of this character which is compact and is made of comparatively light parts, and at the same time is strong and durable.

Objects pertaining to details and economies of my invention will definitely appear from the description to follow. The invention is defined in the claims.

A structure which embodies the features of my invention is clearly illustrated in the accompanying drawing, in which:

Fig. 1 is a fragmentary side elevation looking from the left of Fig. 2 of a brake or clutch mechanism embodying the features of my invention.

Fig. 2 is a fragmentary view mainly in section on the broken line 2—2 of Fig. 1.

Fig. 3 is a fragmentary view mainly in section on line 3—3 of Fig. 1.

Fig. 4 is a fragmentary view partially in section with the parts in released position.

In the accompanying drawing I represents the brake drum and 2 an axle. It should be understood, however, that my improvements are readily adapted or embodied for use in various relations, as in clutches or brakes other than those for motor vehicles. The plate-like support 3 is suitably mounted as on an axle housing, a fragment of which is indicated at 4.

I provide a plurality of segmental brake shoe or clutch members 5 preferably of channel cross section as illustrated, the facings therefor being indicated at 6. These shoes 5 have centrally disposed webs 7 to facilitate attachment of the links 8 thereto. The links are pivotally connected to these webs at 9.

The links 8 are mounted upon the support for pivotal movement, this mounting consisting of the pins 10 which engage the longitudinal slots 11 in the links. The pins have collars 12 for supporting the links laterally. The links are arranged in pairs and the inner ends thereof are connected by the pivots 13 to the annular actuating member 14. This actuating member is concentrically mounted on the support for rotative movement, the mounting consisting of the studs 15 having grooved rolls 16 thereon engaging the inner edge of the actuating member.

It will be observed that the pivots 9 and 13 are at all times on opposite sides of the radial planes of the pins 10.

To limit the inward movement of the shoes and prevent undue tilting thereof on their pivots 9, I provide stops 17 which are disposed on the support at the ends of the shoes so that each stop coacts with a pair of the shoes as illustrated in Fig. 4.

The actuating means for the actuating member 14 in the structure illustrated consists of the rockshaft 18 having an arm 19 on the outer end thereof to which the control rod 20 is connected. On its inner end the rockshaft is provided with a pair of arms 21 disposed on opposite sides of the actuating member 14 and slotted at 22 to receive the pin 23 on the actuating member.

By this arrangement of parts I secure a very powerful brake or clutch, or like mechanism, and substantially the full braking surface of the drum is utilized, the shoes being supported so that pressure is uniformly applied throughout the length thereof. The result is increased gripping action and surface, and also minimizing of wear.

A further advantage is that the mechanism is a powerful one, that is, the power applied to the control rod is very substantially increased by the mechanism.

A still further advantage is that the parts are supported so that the strain thereon is minimized.

Having thus described my invention what I claim as new and desire to secure by Letters Patent is:

1. In a structure of the class described, the combination of a drum, a plate-like support member, a plurality of segmental shoes of channel cross section provided with centrally disposed webs, an annular actuating member disposed at the side of said support in concentric relation to said drum, said support being provided with rollers coacting with the inner edge of said actuating member for rotatably supporting the same, longitudinally slotted links pivotally connected to said webs on said shoes and to said actuating member, pins on said support engaging said slots in said links, said support being provided with stops disposed at the ends of said shoes in coacting relation to adjacent pairs of shoes to limit the inward movement thereof, and an actuating rockshaft mounted on said support and provided with a longitudinally slotted arm, said actuating member having a pin engaging said slot whereby rotating movement may be imparted to said actuating member.

2. In a structure of the class described, the combination of a drum, a plate-like support member, a plurality of segmental shoes of channel cross section provided with centrally disposed webs, an annular actuating member disposed at the side of said support in concentric relation to said drum, said support being provided with rollers coacting with the inner edge of said rotating member for rotatably supporting the same, longitudinally slotted links pivotally connected to said webs on said shoes and to said actuating member, pins on said support engaging said slots in said links, and an actuating rockshaft mounted on said support and provided with a longitudinally slotted arm, said actuating member having a pin engaging said slot whereby rotating movement may be imparted to said actuating member.

3. In a structure of the class described, the combination of a drum, a support member, a plurality of segmental shoes, an annular actuating member rotatably mounted at the side of said support in concentric relation to said drum, longitudinally slotted links pivotally connected to said shoes and to said actuating member, pins on said support engaging said slots in said links, said support being provided with stops disposed at the ends of said shoes in coacting relation to adjacent pairs of shoes to limit the inward movement thereof, and means for actuating said actuating member.

4. In a structure of the class described, the combination of a drum, a support member, a plurality of radially and circumferentially movable segmental shoes, an annular actuating member rotatably mounted at the side of said support in concentric relation to said drum, longitudinally slotted links pivotally connected to said shoes and to said actuating member, pins on said support engaging said slots in said links, and means for actuating said actuating member.

5. In a device of the class described, the combination of a drum, a support member, a plurality of segmental radially and circumferentially movable shoes coacting with said drum, an actuating member rotatably mounted on said support, longitudinally slotted links pivotally connected to said shoes at a central point and to said actuating member, said support being provided with pins engaging said slots in said links, and means for rotating said actuating member, the pivotal connection for said links to said shoes and to said actuating member being at all times on opposite sides of the radial planes of the pivots for said links to said support.

6. In a device of the class described, the combination of a support member, a plurality of radially and circumferentially movable actuated members, an actuating member rotatably mounted on said support, longitudinally slotted links pivotally connected to said actuated member and to said actuating member, said support being provided with pins engaging said slots in said links, and means for rotating said actuating member, the pivotal connection for said links to said actuated members and to said actuating member being at all times on opposite sides of the radial planes of the pivots for said links to said support.

7. In a mechanism of the class described, the combination of a support member, segmental shoes, an actuating member rotatably mounted on said support member, means for actuating said actuating member, links pivotally connected to said actuating member and to said shoes having pin and slot connection to said support, and means on said support limiting the inward and tilting movement of said shoes on said links.

8. In a mechanism of the class described, the combination of a support member, radially and circumferentially movable segmental shoes, an actuating member rotatably mounted on said support member, means for actuating said actuating member, and links pivotally connected to said actuating member and to said shoes having pin and slot connection to said support.

JOSEPH MELLING.